Patented Feb. 17, 1953

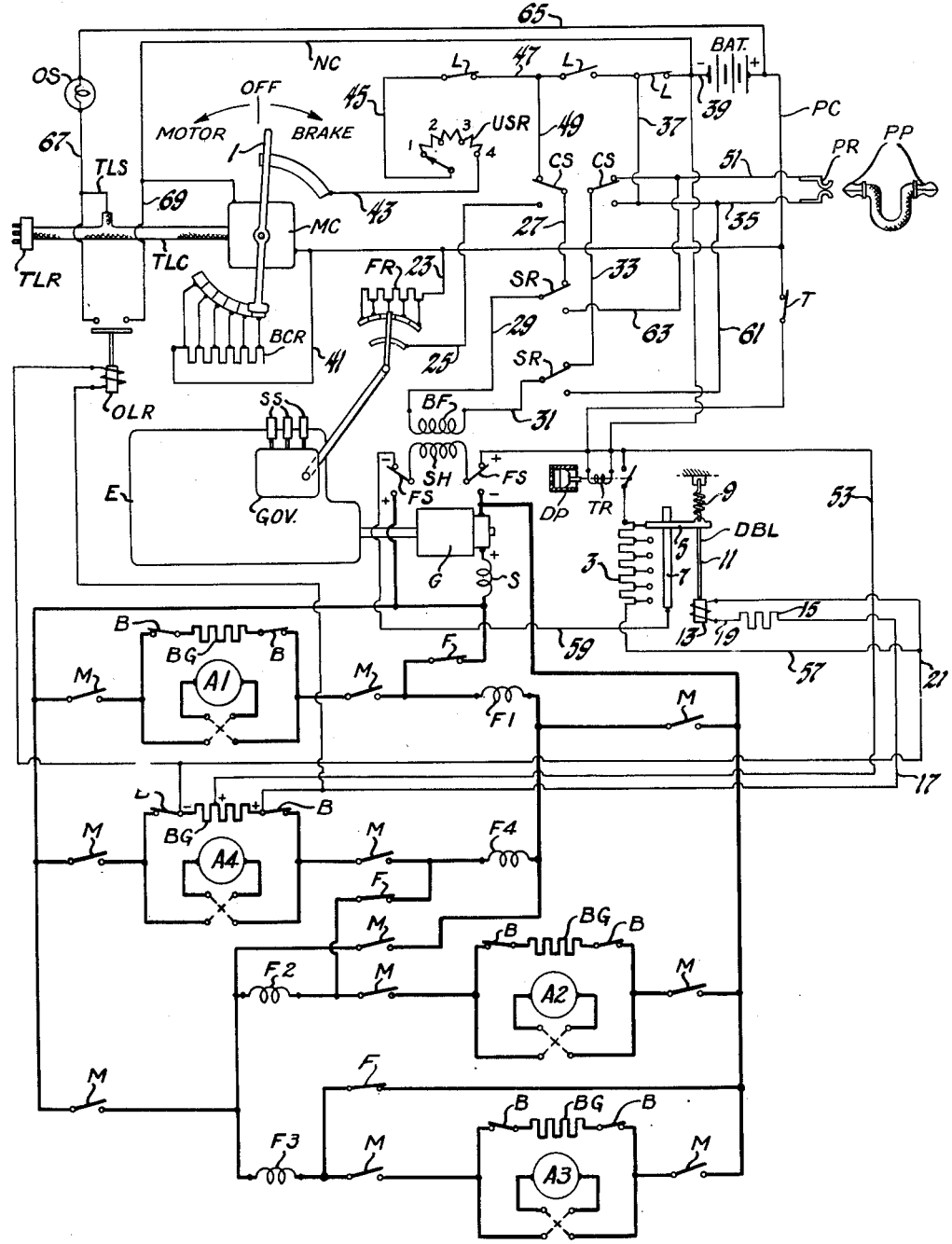

2,629,058

UNITED STATES PATENT OFFICE 2,629,058

ELECTRIC TRACTION AND BRAKING SYSTEM

Torsten O. Lillquist, La Grange Park, Ill., assignor to General Motors Corporation, Detroit, Mich., a corporation of Delaware Application May 28, 1951, Serial No. 228,569

17 Claims. (Cl. 290—3)

This invention relates, generally, to electric traction systems and more particularly to combined generating electric traction and braking systems for locomotives.

The principal object of the invention is to provide a simple combined generating electric traction and control system for a locomotive including manual means for controlling the tractive and braking effort of the locomotive traction means, control means acting automatically to limit the electric braking current to a predetermined safe value, signal and signal control means to indicate values of braking current in excess of the safe value and means whereby the control system may be connected in multiple with similar systems on other locomotive units for multiple control by the manual control means of any locomotive unit and signal indications are provided on all connected locomotive units upon excessive braking current on any connected unit.

For a clear understanding of the object of the invention, reference may be had to the following detailed description, taken in conjunction with the single diagrammatic drawing illustrating a form of the invention which is particularly adaptable to a diesel electric locomotive.

Referring to the drawing, there is shown therein equipment for a locomotive unit and control means for this unit and control means is also shown for interconnection of other locomotive units of similar type for multiple control. The equipment shown includes a diesel engine E and electric generator G driven thereby and four traction motors having series field windings F1, F2, F3 and F4, and armatures A1, A2, A3 and A4. The motor armatures are individually connected in conventional manner to separate locomotive traction wheels, not shown, to drive these wheels or to be driven thereby.

Power connections are shown in heavy lines on the drawing, extending between the generator and traction motors and the power connections include conventional switching means M, B and F of the remotely controlled, electromagnetic or electropneumatic type.

The switching means M serve as motor switching means and when closed in proper combinations serve to connect the traction motors in series-parallel or parallel driving circuit relation with the generator in conventional manner.

The switching means B and F serve as braking switching means and when closed simultaneously, to the positions shown, the motor armatures A1, A2, A3 and A4 are connected individually across identical braking resistors BG by closure of the switching means B and the motor series field windings F1, F2, F3 and F4 are connected in series circuit with the armature of the generator G for separate excitation thereby upon closure of the switching means F. The motors are then connected to act as separately excited braking generators and exert braking effort on the locomotive wheels when excited and driven by the locomotive traction wheels. The braking current generated by the motors and braking effort exerted thereby on the locomotive traction wheels is proportional to the motor excitation current and motor armature speed.

The genertaor G is provided with a plurality of field windings, including a series field winding S, shown connected in series with the power conductors, connected with the motors, and also a shunt field SH and a separately excited battery field winding BF.

The shunt field winding SH is connected by double throw switching means FS, also of the electromagnetic or electropneumatic type, in shunt circuit relation with the generator armature when the motors are connected in driving circuit relation to supplement the excitation of the battery field winding BF. When the traction motors are serving as dynamic braking generators the switching means FS is moved to the position shown to connect the generator shunt field winding SH to an excitation circuit, to be subsequently described, to buck or oppose the excitation from the generator battery field winding BF and thereby limit the dynamic braking current to a safe value. The switching means FS serve as generator shunt field switching means.

Other electromagnetic or electropneumatic switching means SR, CS and L are shown connected in the generator battery field circuit and serve as generator battery field switching means.

The engine E is provided with a conventional speed governor GOV for operating conventional engine fuel regulating means, not shown, and for also operating a field rheostat FR and the generator battery field circuit in a well known manner so that the engine and generator are caused to operate at constant speed, load and power output. The governor GOV is also provided with conventional electromagnetic or electropneumatic speed setting means SS so that the engine and generator are caused to operate at any one of a plurality of predetermined constant values of speed, load and power output for each speed setting of the governor.

A master controller MC, having a manually operable control lever I movable in opposite direction to brake and motor controlling positions from an intermediate "off" position, is provided for controlling energization and operation of the various switching means and governor speed setting means to control the tractive and braking effort of the traction motors. The control lever of the master controller MC also is shown provided with a contact for regulating the resistance in a braking control rheostat BCR when moved in the brake control positions.

The electromagnetic or electropneumatic means for controlling operation of the governor speed setting means SS and switching means M, B, F, FS, SR, CS and L are connected to a battery BAT by control conductors, included in a train line conduit TLC. The control conductors being connected to suitable motor and braking contacts in the master controller for energization of the speed setting means and switching means. Multiple contact receptacles, one of which is shown at TLR, are located on each end of the locomotive and the contacts of these receptacles are connected to the control conductors. Suitable jumper conductors having multiple contact plugs, not shown, on the ends are insertable in the receptacle plugs on adjacent ends of similar coupled locomotive units and serve to connect similar controllers, speed setting and switching means for multiple unit control.

The switching means SR serve as generator battery field series loop switching means and are arranged to be moved in a well-known way to the position shown when the master controller MC is placed in either the motor or brake control positions. The switching means SR will drop to their lower positions only when a master controller on another locomotive unit connected in multiple therewith is moved to the brake control position.

Polarized receptacles, one of which is indicated at PR, are provided on opposite ends of the locomotive unit and are connected in the generator battery field circuit. Each of these receptacles are provided with a pair of normally closed contacts. A two-wire jumper conductor having a double contact polarized plug PP on each end provides the means for connecting the battery field circuits of other locomotive units in series loop circuit relation through the loop switching SR means thereon with the battery BAT and braking control rheostat BCR of one locomotive unit for control thereof.

A unit selector rheostat USR is included in the generator battery field series loop circuit and this rheostat includes a manually movable contact adapted to be set in a first position 1, as shown, to include all the resistance therein when the locomotive unit is to be operated alone. The contact arm is set in positions 2, 3 and 4 to reduce the resistance therein in three equal steps when two, three or four locomotive units are to be connected in series loop circuit relation with the battery and braking control rheostat BCR of the master controller MC used for controlling the connected locomotive units.

Automatic potential adjusting means DBL are provided to limit the dynamic braking current generated by the traction motor armatures A1, A2, A3 and A4 connected across the braking resistors BG to a predetermined safe value. This automatic means DBL is a potentiometer including a resistor 3 having spaced taps, each provided with a contact, and a movable contact 5 engageable with these tap contacts and a contact bar 7. The movable contact is normally urged by a spring into contact with the upper end of the contact bar 7 and the adjacent contact on the upper end tap of the resistor 3. A plunger 11 is attached to the movable contact 5 and a solenoid winding 13 is provided for moving the plunger 11 and movable contact 5 downwardly against the action of the spring 9. The solenoid winding 13 terminals are shown connected by conductors 17, 19 and 21 in series with a resistor 15 between the positive and negative terminals of the braking resistor BG connected across the motor armature A4, and when the dynamic braking current therein increases to a value slightly greater than a predetermined safe value the potential drop across this braking resistor applied to the solenoid 13 causes downward movement of the potentiometer plunger 11 and movable contact 5 against the action of the spring 9 to apply potential through the upper contacts of the shunt field switching means FS from this braking resistor to the generator shunt field winding SH in proper direction to buck the excitation of the generator battery field winding BF. This reduces the current supplied by the generator armature G to the traction motor field winding F1, F2, F3 and F4 and thereby reduces the braking current generated by the motor armatures each connected across a separate braking resistor BG, to the predetermined safe value. The spring 9 of the potentiometer means DBL then returns the movable contact 5 to the normal position in which no potential is applied to the generator shunt field winding. The circuit connections by which this action takes place will be subsequently described.

Positive and negative control conductors PC and NC are connected between the positive and negative terminals of the battery BAT and the master controller MC to energize the above mentioned electromagnetic or electropneumatic governor speed setting means and switching means through suitable speed setting, motor and braking contacts, not shown, in the master controller MC. The positive and negative control conductors PC and NC extend into the train line conduit and these conductors are also included in the train line conduit TLC.

When the handle 1 of the master controller MC is moved from the "off" position to the motor control positions the traction motors are connected in series-parallel or parallel power circuit relations with the generator armature by energization and operation of certain of the motor switching means M, as previously mentioned. Also the generator battery field switching means L, SC and SR, the generator shunt field switching means FS and the governor speed setting means SS are energized. With the handle 1 of the master controller MC in any motor controlling position the shunt field switching means FS are moved from the upper position, as shown, to the lower position to connect the generator shunt field SH across the generator armature G. The battery field switching means L and SR move to the positions shown and the switching means CS move from the upper positions, as shown, to the lower positions. With the battery field switching means in these positions, the generator battery field BF is connected in series circuit relation with the battery BAT and field rheostat FR through conductors PC, 23, 25, 27, 29, 31, 33, 35, 37 and 39. Also the governor speed setting means SS are energized when the master controller handle 1 is in the motor control position to vary the setting of the governor GOV and cause operation of the engine E and generator G driven thereby at any desired constant value of speed, load and power output to vary the power supplied to the traction motors and the tractive effort exerted thereby on the locomotive traction wheels.

As previously explained when the master controller lever 1 is moved from the "off" position to the brake control position, as shown, the motor braking switching means B and F and the generator shunt and battery field switching means FS, L, CS and SR are energized and move to the positions shown and maximum resistance is included in the braking control rheostat BCR. With the battery field switching means L, CS and SR in the positions shown, the generator battery field is then connected in series circuit relation with the battery BAT, the braking control rheostat BCR, the unit selector rheostat USR and the normally closed contacts of the polarized receptacle PR by conductors PC, 41, 43, 45, 47, 49, 27, 29, 31, 33, 51, 35, 37 and 39. The current supplied from the battery BAT through the above circuit connections to the generator battery field winding BF is then under control of the braking control rheostat BCR and the farther the handle 1 of the master controller MC is moved clockwise in the brake control position the greater the excitation in the generator battery field winding BF and the greater the motor excitation current supplied by the generator G to the motor field windings F1, F2, F3 and F4 and hence the greater the dynamic braking current generated by the motor armatures A1, A2, A3 and A4 supplied to the braking resistors BG and the greater the braking effort of the motor armatures on the locomotive traction wheels.

With the generator shunt field switching means FS in the position shown the right hand terminal of the generator shunt field winding SH is connected directly by means of a conductor 53 to a positive intermediate tap of the braking resistor BG connected across the motor armature A4 and the contact bar and lower terminal of the potentiometer resistor 3 are connected in series between the negative tap of this braking resistor and the left hand terminal of the shunt field winding. This causes limited current to initially flow through the potentiometer resistor 3 and through generator shunt field winding SH in opposing or bucking relation to that when the shunt winding was connected to the generator armature, to destroy the residual magnetism remaining in the generator shunt field. This prevents this residual magnetism acting to supplement the excitation of the generator battery field winding BF and thereby prevents a sudden increase in the dynamic braking current. At the same time this generator shunt field circuit is established the winding of a time delay relay TR is connected across the positive and negative control conductors PC and NC by closure of a switch T, also of the electromagnetic or electropneumatic type and connected by suitable train line conductors in the train line conduit and suitable contacts of the master controller MC which are closed when the controller is in the brake controlling position. The normally open contacts of the time delay relay TR are shown connected between the conductor 53 and upper terminal of the potentiometer resistor 3 and a dash pot DP is connected to these relay contacts to delay closure thereof until the residual magnetism of the generator shunt field is destroyed. Upon delayed closure of the relay contacts the potentiometer means DBL is then connected in potential controlling relation between the braking resistor BG and the generator shunt field winding SH. With the contacts of the time delay relay TR closed and with the movable contact 5 and plunger 11 of the potentiometer DBL retained in the upper normal position, as shown, both terminals of the generator shunt field winding SH are at the same potential and this winding remains unexcited. When, however, the braking current in the braking resistor BG, connected across the motor armature A4, increases to a value slightly above the predetermined safe value and the solenoid 13 pulls the plunger 11 and movable contact 5 of the potentiometer down against the action of the spring 9, current will flow between the positive intermediate tape and negative terminal of the braking resistor BG through the shunt field winding SH of the generator by way of conductors 53 and 59, contact bar 7, contact 5, the lower portion of the potentiometer resistor 3 and conductors 57 and 21. It will be noted that current flow in this direction through the generator shunt field winding SH is also reverse to that when this winding was connected to the positive and negative terminals of the generator armature G and the excitation from the shunt field winding SH then bucks the battery field winding BF. This causes a prompt reduction in the dynamic braking current to the safe value and the return of the movable potentiometer contact 5 by the spring 9 to de-energize the shunt field winding SH.

The train line receptacle TLR provides the means whereby the control conductors in similar train line conduits of other similar locomotives may be connected in multiple and the switching means and governor speed setting means on the multiple connected locomotives may be controlled by the master controller on any locomotive unit to control the motor tractive and braking effort of these connected locomotive units. The polarized receptacles PR and similar receptacles on other locomotive units when connected by the polarized plugs PP and jumper conductors therebetween provide the means whereby the generator shunt field windings SH of other similar locomotive units may be connected in series loop circuit with the batter BAT and braking control rheostat BCR operated by the master controller handle 1 of any connected locomotive unit to control the dynamic braking force of the connected locomotive units. As explained the selector switch SR on the locomotive unit on which the master controller MC is operated moves to the position shown and the selector switch means on the other units fall to the lower positions to complete a series loop generator battery field circuit. It will be observed that the lower contact of one of the selector switching means SR is connected by a conductor 61 to the conductor 35 which is connected to one contact of the polarized receptacle PR and the lower contact of the other selector switching means is connected by a conductor 63 to the conductor 51 which is connected to the other polarized receptacle contact. With the control systems of a plurality of locomotive units connected in multiple the tractive and braking effort of the traction motors of the locomotive units may be controlled by a master controller MC on any locomotive unit and the automatic potentiometer means DBL on each locomotive unit acts to limit the dynamic braking current of each locomotive unit to a safe value.

A dynamic brake overload signal lamp OS is shown adjacent the master controller MC and this lamp is connected in series by conductors 65, 67 and 69 with the normally open contacts of an overload relay OLR between the positive and negative control conductors PC and NC and a train line signal conductor TLS is shown connected to the conductor 67 and extending into the train line conduit for connection to similar train line signal conductors in the train line conduits of other locomotive units and overload relays thereon for simultaneous illumination of all of the overload signal lamps OS on the multiple connected locomotive units upon operation of any overload relay on any locomotive unit. The overload relay OLR is provided with a coil connected across the conductors 17 and 21, which are connected to the positive and negative terminals of the braking resistor BG connected across the motor armature A4. The overload relay coil on a locomotive unit is energized to cause closure of the relay contacts only upon a rise in dynamic braking current slightly greater than the predetermined safe value and thereby causes illumination of the overload signal lamp OS of the locomotive unit and the illumination of all the other signal lamps connected in multiple therewith by the train line signal conductor TLS. By means of these connections between the signal lamps and relays therefor, closure of the contacts of a signal relay on any locomotive unit causes illumination of the signal lamps on all of the multiple connected locomotive units.

The illumination of signal lamp on the locomotive unit adjacent the master controller MC operated by the locomotive engineer provides the means by which he is warned of excessive dynamic braking current on the locomotive he is controlling and also on other locomotive units connected in multiple with the master controller he is operating. As explained the dynamic braking current increases with the speed of the motor armatures and also with the motor excitation current under control of the braking control rheostat BCR operated by the master controller handle 1. If one of the locomotive units of a plurality of multiple connected units has worn wheels, which will be rotated at higher speed, the locomotive engineer will be informed of excessive braking current on the unit having worn wheels by illumination of the signal light by the flashing of this lamp as this condition is corrected each time the automatic potentiometer means DBL operates to reduce the current to a safe value. This locomotive engineer may then move the master controller handle 1 to reduce the dynamic braking current or apply the locomotive air brakes depending upon operating conditions to eliminate this excessive dynamic current braking condition.

It will be evident that the automatic potentiometer means DBL initially acts to limit current flow in the generator shunt field winding in bucking relation to the battery field winding to destroy the residual magnetism in the shunt field winding to prevent a sudden build-up in the dynamic braking current in the motor armatures A1, A2, A3 and A4 and braking resistors BG. The contacts of the time delay relay TR are delayed in closing until the residual magnetism in the generator field winding is destroyed and this winding is then connected in zero potential relation with the potentiometer means DBL. The solenoid 13 acts upon a slight rise in the dynamic braking current to move the movable contact 5 of the potentiometer means to apply potential from the braking resistor BG to the generator shunt field winding SH in bucking relation to the battery field winding to promptly reduce the braking current to the safe value. The overload relay OLR also acts under the same conditions to cause illumination of overload signal lamp and upon this prompt reduction of the current to the safe value the signal lamp goes off promptly indicating that the potentiometer means DBL is operating properly.

The above described control system provides manual control of the tractive and braking effort of one or more locomotive units and automatically limits the dynamic braking current of each locomotive unit to a predetermined safe value and also provides a signal indicating on all locomotive units of braking current in excess of the predetermined safe value on any locomotive unit.

I claim:

1. In a generating electric drive and braking system for a locomotive, an engine driven generator having first and second excitation circuits, manually operable excitation current control means in one of said circuits, a locomotive traction motor having a field winding connected to the generator and an armature driven by the locomotive, a braking resistor connected to the motor armature, and potentiometer means connected with the braking resistor and said second generator excitation circuit, said potentiometer means including a control element movable to vary the potential applied to said second circuit to buck the excitation of said first generator circuit, means connected to the control element and operable in response to the potential drop in the braking resistor for moving the control element and spring means opposing movement of the control element.

2. In a generating electric drive and braking system for a locomotive, an engine driven generator having first and second excitation circuits, manually operable excitation current control means in said first excitation circuit, a locomotive traction motor having a field winding connected to the generator and an armature driven by the locomotive, a braking resistor connected to the motor armature, potentiometer means connected to the braking resistor and second generator excitation circuit to initially limit the current therein and to buck the excitation from the first excitation circuit and time delay switching means operable subsequently to connect the potentiometer means with the braking resistor and second excitation circuit to apply zero potential thereto, means operable in response to a preselected potential drop in the braking resistor to operate the potentiometer means and vary the potential applied to the second generator excitation circuit to increase the bucking action thereof with respect to the first generator excitation circuit and means normally biasing the potentiometer means to a low potential controlling position.

3. In a generating electric drive and braking system for a locomotive, an engine driven generator having a first excitation circuit including manual means for varying the excitation current therein and a second excitation circuit including potential controlling means provided with a movable control element, spring means positioning the control element to prevent application of potential to said second circuit and a solenoid for moving said control element against the action of the spring means to apply potential to said second excitation circuit to buck the excitation from the first circuit, a traction motor having a field winding connected to the generator and an armature driven by the locomotive, a braking resistor connected to the motor armature and an electrical winding connected to the braking resistor and acting in response to excessive braking current therein to move the movable element and reduce the current therein.

4. In a generating electric traction and braking system for a locomotive, an engine driven generator having first and second excitation circuits, means to excite said first excitation circuit, a locomotive traction motor having a field winding connected to the generator and an armature driven by the locomotive, a braking resistor, means connecting the resistor across the motor armature, potential control means connected in potential drop relation to the braking resistor and to said second generator excitation circuit and including a movable control element operable to apply potential to said second circuit to oppose the excitation of said first circuit, said potentiometer means including a spring urging the control element to a zero potential controlling position and electrical means connected in potential drop relation with the braking resistor for moving the control element against the force of the spring.

5. In a generating electric traction and braking system for a locomotive, an engine driven generator having first and second excitation circuits, a locomotive traction motor having a field winding and an armature driven by the locomotive, a motor braking resistor, potentiometer means including a movable control element and spring means normally biasing the element to a zero potential controlling position, means connected to the braking resistor and acting in response to a preselected value of braking current therein to move the movable potentiometer control element against the biasing means therefor, first switching means operable to connect the motor field winding to the generator, to connect the motor armature to the generator and to connect the potentiometer means in current limiting relation with the braking resistor and second generator excitation circuit to buck the first excitation circuit and time delay switching means operable subsequently to said first switching means to then connect said potentiometer means in potential controlling relation with said second generator excitation circuit and braking resistor for operation by said automatic means to increase the potential applied to said second generator excitation circuit to buck the excitation of said first circuit and thereby limit the braking current to said preselected value.

6. In a generating electric traction and braking system for a locomotive, an engine driven generator provided with an excitation circuit including manually operable excitation current varying means, and a second excitation circuit, a locomotive traction motor having a field winding connected in excitation circuit relation with the generator and an armature for driving and for braking the locomotive, a braking resistor connected across the motor armature to receive braking current generated by the motor armature when driven and excited, potential control means connected in potential drop relation with the braking resistor and connected in potential controlling relation with the second generator excitation circuit, said potential control means including a movable control element to apply potential said second excitation to buck the excitation from said first excitation circuit to reduce the motor excitation and generated braking current, a solenoid connected in potential drop relation with the braking resistor for moving the movable control element, spring means opposing movement of the control element by the solenoid, a signal and signal control means also connected in potential drop relation with the braking resistor to provide a signal indication of operation of the potential controlling means.

7. In a generating electric drive and braking control system for a locomotive, an engine, a generator having an armature driven by the engine, a first excitation circuit including a source of current and a manually operable braking control rheostat and a second excitation winding to buck the excitation of the first circuit, a traction motor having a field winding connected to the generator armature for excitation thereby, and an armature driven by the locomotive, a braking resistor, means connecting the motor armature to the resistor to absorb the current generated by the motor armature when driven, potentiometer means connected in potential drop relation with the resistor and potential controlling relation with said second generator field winding, said potentiometer having a movable control element to vary the potential on said second field winding and means biasing the control element to a zero potential controlling position and solenoid means connected in potential drop relation with the resistor to move the control element against the action of the biasing means upon an increase in braking current in the resistor to control the braking current therein.

8. In a generating electric traction and braking system for a locomotive unit, an engine driven generator having first and second field windings, a source of current, a manually operable braking control rheostat, means including switching means to connect said first field winding in circuit relation with the rheostat and current source, a plurality of traction motors having field windings and armatures for driving separate locomotive traction wheels and to be driven thereby, means including other switching means to connect the motor field windings with the generator for excitation thereby, a plurality of braking resistors, means including other switching means to connect a braking resistor across each motor armature, solenoid means connected across one braking resistor and operable at a value of braking current therein above a safe value, potentiometer means including a movable control element operable by the solenoid means and spring means for biasing the control element to a low potential controlling position, means including other switching means to connect said second generator field winding in bucking relation with said first field winding through the potentiometer means to a braking resistor to reduce the residual magnetism of said second field winding, time delay switching means subsequently operable to connect said second generator field winding in potential controlling relation with the potentiometer means and a braking resistor for operation by the solenoid to buck the excitation of said first field winding and limit the braking current in the braking resistors to said safe value and control connections including a master controller operatively connected to the braking control rheostat and connected in controlling relation with all of said switching means.

9. In a generating electric traction and braking system for a locomotive unit, an engine driven generator having first and second field windings, a source of current, a manually operable braking control rheostat, means including switching means to connect said first field winding in circuit relation with the rheostat and current source, a plurality of traction motors having armatures for driving separate locomotive wheels and to be driven thereby, and motor field windings, means including other switching means to connect the motor field windings in series excitation circuit relation with the generator, a plurality of braking resistors, means including switching means to connect a braking resistor across each motor armature, potentiometer means having a movable potential controlling element and connected in potential drop relation with one of said braking resistors, means including switching means to connect the potentiometer means in potential controlling circuit relation with said second generator field winding to oppose the excitation of said first generator field winding, said potentiometer means having resilient means urging the movable control element to a low potential controlling position, and solenoid means also connected in potential drop relation with said braking resistor for moving the controlling element toward a higher potential controlling position.

10. In a generating electric traction and braking system for a locomotive, an engine driven generator having first and second field windings, a current source, a braking control rheostat, means including switching means to connect the current source and braking rheostat in circuit relation with said first field winding, a plurality of traction motors, each having an armature for driving and to be driven by the locomotive, and a field winding, a braking resistor for each motor armature, means including switching means to connect the motor field windings in excitation circuit relation with the generator and to connect each motor armature across a braking resistor, potentiometer means having a movable potential controlling element and connected in potential drop relation with one braking resistor, means including switching means to connect the potentiometer in potential controlling circuit relation with said second generator field winding to oppose the excitation of said first field winding, a solenoid connected in potential drop relation with a braking resistor to move the potentiometer controlling element to vary the potential applied to said second field winding, spring means opposing movement of the controlling element, a manually operable controller and control connections interconnecting the braking rheostat and all of said switching means to the controller for joint control thereby.

11. In a generating electric drive and braking system for a locomotive unit, an engine, a generator driven thereby and having first and second field windings, a source of current, a braking control rheostat, receptacle contacts, connections including switching means to connect said first field winding in series excitation circuit relation with the current source, the braking control rheostat and the receptacle contacts, said contacts serving to connect similar generator field windings on other locomotive units in series relation, potential control means for said second generator field winding operable to apply varying potential of proper polarity to buck the excitation of said first field winding to reduce the generator current output, a plurality of locomotive traction motors each having a field winding and an armature arranged to drive and to be driven by a separate traction wheel of the locomotive unit, motor braking resistors, connections including switching means to connect the motor field windings in series excitation circuit relation and to connect each motor armature across a separate braking resistor, means connecting the potential controlling means in potential drop relation with one braking resistor, a solenoid connected to said braking resistor to operate the potential controlling means upon excess braking current therein, control connections for all of said switching means and including other receptacle contacts for connecting similar switching means on other locomotives in multiple therewith, and a manually operable master controller operably connected to the braking control rheostat and connected to said control connections for controlling operation of said rheostat and switching means.

12. In a generating electric traction and braking system for a locomotive unit, an engine having speed controlling means, a generator driven thereby and having first and second field windings, a battery, a braking control rheostat, polarized receptacle contacts, connections including switching means to connect said first field winding in series excitation circuit relation with the battery, the rheostat and polarized receptacle contacts, said contacts serving to connect similar generator field windings on other locomotives in series with said first field winding, potentiometer control means for said second generator field winding and including a control element, movable to apply potential to said winding to buck the excitation from the first field winding, spring means biasing said element to a zero potential controlling position, connections including switching means to connect the potentiometer controlling means in controlling relation with the second generator field winding, a plurality of traction motors each having a field winding and an armature to drive or to be driven by a separate locomotive wheel, a braking resistor for each motor armature, motor connections including switching means to connect the motor field windings in series with the generator and to connect each motor armature across a braking resistor, connections connecting the potentiometer control means in potential relation with a braking resistor, solenoid means connected to said braking resistor to move the potentiometer control element against the action of said spring upon excessive braking current in the resistor and thereby reduce the current therein to a safe value, a signal, an excess current signal relay connected to a braking resistor to operate the signal, a manually operable master controller located adjacent the signal and operatively connected to the braking control rheostat and a train line conduit including switching control conductors connected to the master controller and a signal control conductor and additional receptacle contacts connected to the switching and signal control conductors for interconnecting similar switching means signal relays and signals on other locomotive units in multiple.

13. In a generating electric traction and braking system for a locomotive unit, an engine having speed controlling means, a generator driven by the engine and having first and second field windings, a battery, a braking control rheostat, polarized receptacle contacts, connections including switching means to connect the first field winding in series excitation circuit relation with the battery, the rheostat and the polarized receptacle contacts, said contacts serving to connect similar generator field windings of other locomotive units with said first field winding, said braking control rheostat and said battery, potentiometer control means for said second generator field winding and including a movable control element to apply potential to said second field winding to buck the excitation of said first field winding, spring means biasing said control element to a zero potential controlling position, a plurality of traction motors, each having a field winding, and an armature to drive and to be driven by a separate traction wheel of the locomotive unit, a braking resistor for each motor armature, motor connections including switching means to connect the motor field windings to the generator and each motor armature across a braking resistor, connections including switching means to connect the second generator field winding in series relation with the potentiometer means across a braking resistor to buck the excitation of said first field winding, time delay switching means subsequently operable to then connect the potentiometer means in zero potential controlling relation with said second field winding, a solenoid connected across a braking resistor to move the potentiometer control element upon an increase in braking current therein above a safe value to apply potential to said second field winding to buck said first field winding and reduce the braking current to a safe value, a signal, an excess signal relay connected to a braking resistor to operate the signal, a manually operable controller adjacent the signal and operably connected to the braking control rheostat and train line switching, signal and signal relay controlling connections interconnecting the controller and all of said switching means and the signal and signal relay, said train line controlling connections including connectors for connecting similar switching means of other locomotive units for multiple control by the master controller and for connecting the signal and signal relay in multiple with signals and signal relays of other locomotive units.

14. In a drive and braking control system for a generating electric locomotive, an engine, a generator driven thereby, means for controlling the engine speed, a traction motor having a field winding connected in excitation circuit relation with the generator and an armature adapted to drive and to be driven by the locomotive, a braking resistor connected across the motor armature, said generator having a separately excited field winding, a braking control rheostat connected to the separately excited field winding for controlling the motor excitation current supplied by the generator to vary the braking current in the braking resistor from the motor armature, said generator also having a second field winding, potential controlling means for said second field winding connected in potential drop relation with the braking resistor and acting upon a potential drop corresponding to a predetermined value of braking current in excess of a safe value to apply potential to said second field winding to buck the excitation of said first field winding and reduce the braking current to a safe value and means for connecting said second field winding to said potential controlling means.

15. In a generating electric drive and braking system for a locomotive, an engine, a generator driven thereby and having shunt and separately excited field windings, a field rheostat and a braking control rheostat for the separately excited field winding, a governor driven by the engine for controlling the engine speed and field rheostat, said governor having speed setting means, a plurality of traction motors, each having a field winding and an armature for driving and to be driven by the locomotive, braking resistors for the motor armatures, potentiometer means connected to one braking resistor and including a movable control element and means acting in response to a predetermined value of braking current to move the control element to a potential controlling position, switching means to connect the motors and generator shunt field to the generator and to connect the field rheostat to the separately excited generator field winding for control by the governor to control the tractive effort of the motors and other switching means to connect the braking control rheostat to the generator separately excited field winding to connect the motor field windings to the generator, to connect the motor armatures to the braking resistors and to connect the generator shunt field winding to the potentiometer means for control of the braking current by the braking control rheostat and potentiometer means.

16. In a driving and braking control system for a generating electric locomotive, a diesel engine, a generator driven thereby including shunt and separately excited excitation circuits, a field rheostat for controlling the excitation current in the separately excited excitation circuit, an engine driven governor for controlling the engine fuel and field rheostat, said governor having speed setting means, traction motors each having a series field winding and an armature operatively connected to a separate locomotive traction wheel, connections including switching means to connect the motors in driving circuit relation with the generator, to connect the field rheostat in controlling relation in the separately excited generator field circuit and to connect the shunt field circuit with the generator to supplement the separately excited excitation circuit, a braking control rheostat for the generator separately excited excitation circuit, identical braking resistors for each motor, potential controlling means for the generator shunt field circuit connected to one braking resistor and acting in response to a slight increase in current therein above a predetermined value to control the potential in the generator shunt field circuit and buck the excitation of the separately excited generator field circuit and thereby reduce the generator current, connections including second switching means to connect the braking control rheostat in controlling relation with the generator separately excited excitation circuit, to connect the generator in series excitation relations with the motor field windings, to connect each of the motor armatures across a separate braking resistor, and to connect the potential controlling means in controlling relation with the generator shunt excitation circuit, controlling connections including a manually operable controller movable between off and motor driving and braking controlling positions to control the governor speed setting means, the braking control rheostat and said first and second mentioned switching means to control the tractive and braking effort of the traction motors.

17. In a traction and braking system for a generating electric locomotive, a diesel engine, a generator driven thereby and including battery excited and shunt field windings, a battery circuit including a battery, a field rheostat, a braking control rheostat and battery switching means for connecting the battery excited field winding in controlling relation with the field rheostat or braking control rheostat and connecting means in the battery circuit for connecting similar battery excited field windings on other locomotives in series circuit relation with the battery and braking control rheostat, a shunt field circuit including the generator shunt field winding, shunt field switching means for connecting the shunt field winding to the generator to supplement the excitation of the battery field winding or to a source of potential to buck the excitation of the battery field winding, a governor driven by the engine for controlling the engine fuel and field rheostat and having speed setting means to vary the speed, load and power output of the engine and generator, traction motors having armatures for driving and to be driven by separate locomotive traction wheels and series field windings motor switching means to connect the motor fields and armatures to the generator to drive the locomotive, motor braking resistors, motor braking switching means to connect the motor armatures across the braking resistors and to connect the motor fields to the generator, potentiometer means connected to one braking resistor, and including potential controlling means said controlling means acting automatically in response to a predetermined value of braking current above a safe value to apply potential to the generator shunt field winding, said potentiometer controlling means being connected to the generator shunt field switching means, a master controller movable to motor drive and brake control positions said controller operating the braking control rheostat when moved in the brake control positions, control connections interconnecting the governor speed setting and all of said switching means to control the driving and braking action of the motors, connections in the controlling connections for connecting similar master controllers, speed setting means, and switching means on other locomotive units in multiple, an overload signal, an overload signal relay connected to a braking resistor and operable in response to a value of braking current causing operation of the potentiometer means, and signal control connections to connect the relay in controlling relation with the signal, said signal control connections including connecting means to connect similar signals and signal control relay on other locomotives in multiple.

TORSTEN O. LILLQUIST.

REFERENCES CITED

The following references are of record in the file of this patent:

UNITED STATES PATENTS

| Number | Name | Date |
|---|---|---|
| 851,239 | Ihlder | Apr. 23, 1907 |
| 897,537 | Ihlder | Sept. 1, 1908 |
| 1,159,587 | John et al. | Nov. 9, 1915 |
| 2,183,724 | Schroder | Dec. 19, 1939 |
| 2,198,481 | MacDonald et al. | Apr. 23, 1940 |
| 2,304,895 | Dilworth et al. | Dec. 15, 1942 |
| 2,336,052 | Anderson et al. | Dec. 7, 1943 |
| 2,393,620 | Adams et al. | Jan. 29, 1946 |
| 2,409,740 | Dilworth et al. | Oct. 22, 1946 |
| 2,501,477 | Pestarini | Mar. 21, 1950 |
| 2,510,753 | Multhaup | June 6, 1950 |